Oct. 22, 1946.   E. G. MUELLER   2,409,886
VARIABLE LOAD BRAKE
Filed April 12, 1945   3 Sheets-Sheet 1
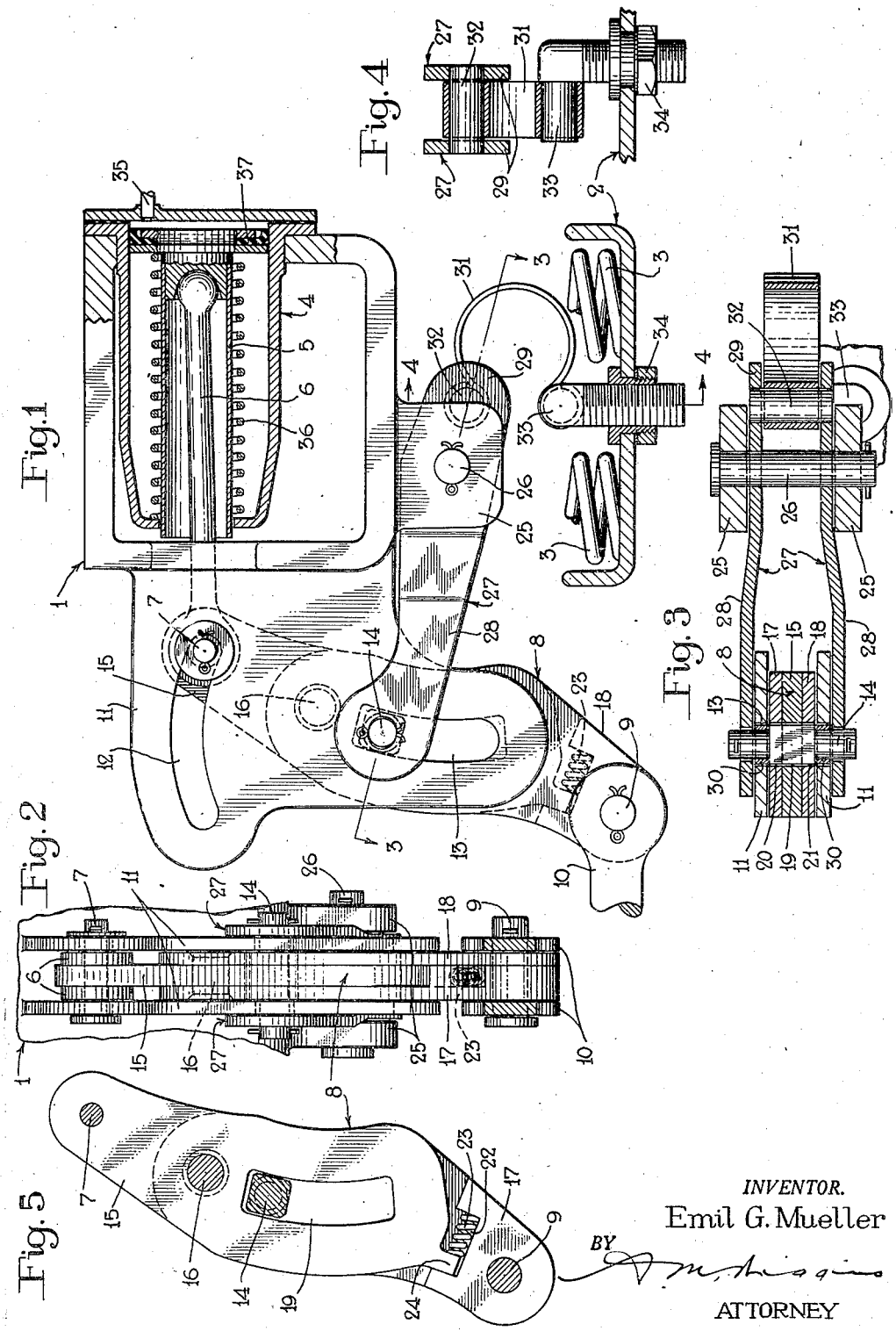
INVENTOR.
Emil G. Mueller
BY
ATTORNEY

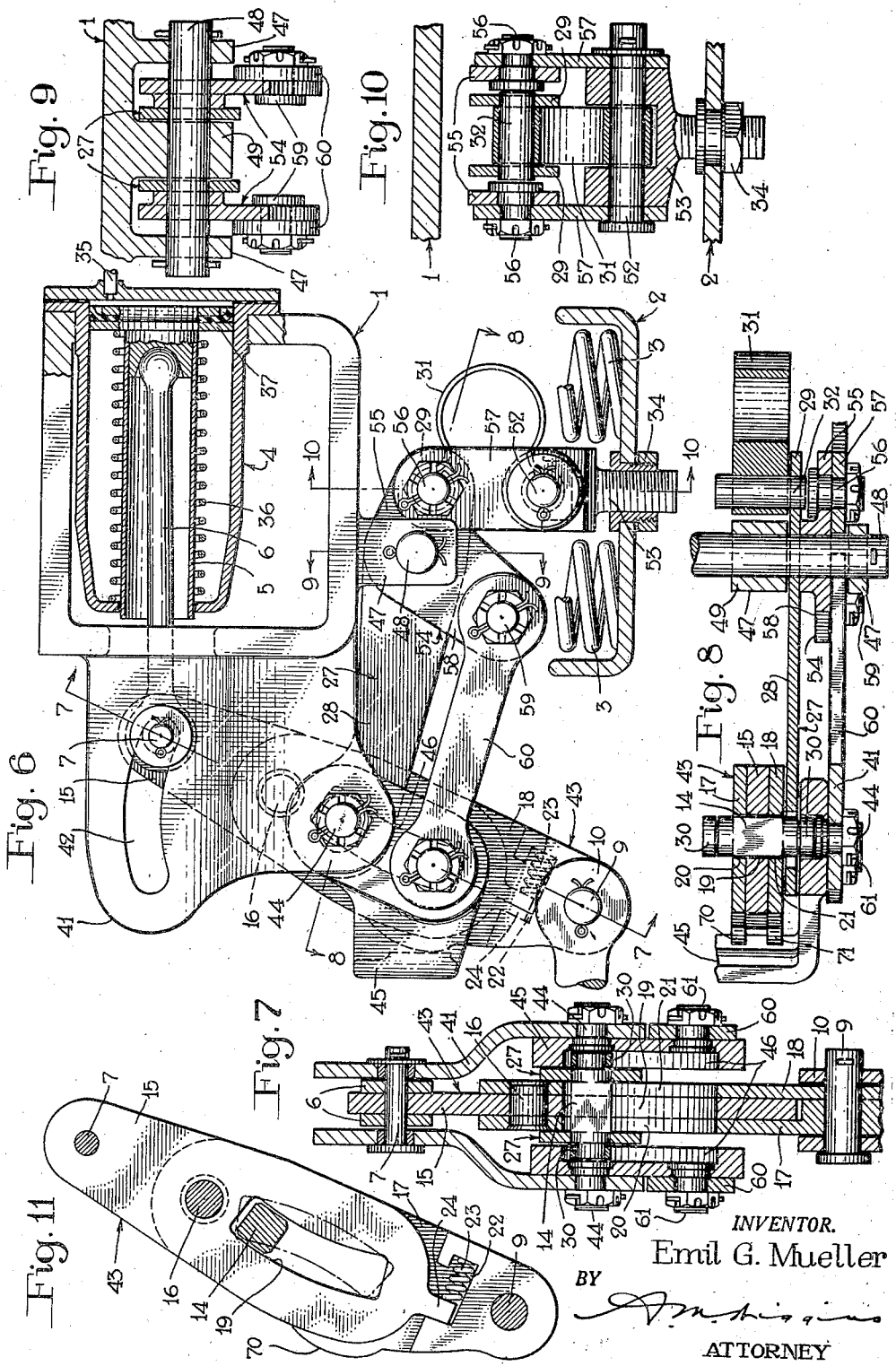

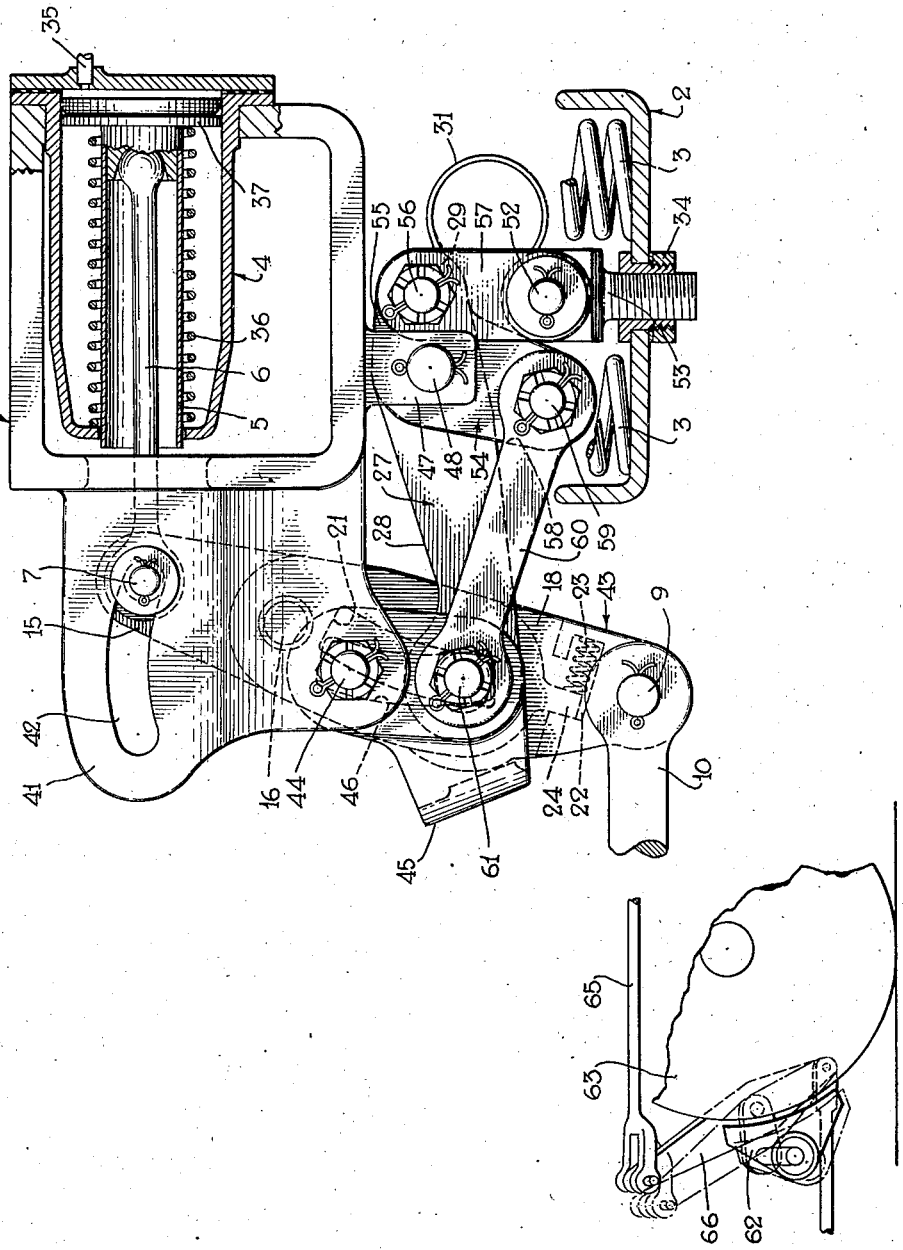

Patented Oct. 22, 1946

2,409,886

UNITED STATES PATENT OFFICE 2,409,886

VARIABLE LOAD BRAKE

Emil G. Mueller, Wilkinsburg, Pa., assignor to The Westinghouse Air Brake Company, Wilmerding, Pa., a corporation of Pennsylvania Application April 12, 1945, Serial No. 587,886

10 Claims. (Cl. 188—195)

This invention relates to railway vehicle brake apparatus and more particularly to variable load brake apparatus of the type in which the brake rigging leverage thereof may be automatically varied in accordance with variations in the weight of the load on the vehicle to correspondingly vary the force with which the brake is adapted to be applied.

An object of the invention is to provide an improved variable load brake apparatus of the above mentioned type.

Another object of the invention is to provide a variable load braked apparatus of the above mentioned type including a novel means which permits variations in the brake rigging leverage only when the brake rigging is in its brake released position.

It is a further object to provide a variable load brake apparatus of the above type which includes novel means whereby the slack in the brake rigging is varied so that the brake cylinder piston travel always remains the same regardless of the changes in the brake leverage ratio resulting from changes in the weight of the load on the vehicle. This feature enables the operator of the vehicle to always obtain the same degree of brake cylinder pressure for any loading condition of the vehicle by the same corresponding manipulation of the brake control valve device.

Other objects and advantages will appear in the following detailed description of the invention.

In the accompanying drawings; Fig. 1 is a side elevational view, partly in section, of a railway vehicle truck embodying the invention, parts of the truck and of the brake rigging being omitted to more clearly illustrate certain details of the invention; Fig. 2 is an end elevational view of a part of the brake rigging apparatus; Fig. 3 is a sectional view of a portion of the brake rigging taken on the line 3—3 of Fig. 1; Fig. 4 is a sectional view of part of the brake rigging taken on the line 4—4 of Fig. 1, a portion of the truck spring plank being shown; Fig. 5 is a side elevational view of a part of the brake rigging shown in Fig. 2 with other parts omitted to more clearly illustrate one feature of the invention; Fig. 6 is a view similar to Fig. 1 showing another embodiment of the invention; Fig. 7 is a sectional view taken on the line 7—7 of a portion of the brake rigging shown in Fig. 6; Fig. 8 is a sectional view taken on the line 8—8 of the brake rigging shown in Fig. 6; Fig. 9 is a fragmentary sectional view taken on the line 9—9 of Fig. 6; Fig. 10 is a fragmentary sectional view taken on the line 10—10 of Fig. 6; Fig. 11 is a side elevational view of a part of the brake rigging shown in Fig. 6 with certain parts omitted to more clearly illustrate one feature of the invention; and, Fig. 12 is a view similar to Fig. 6 showing the brake rigging of Fig. 6 conditioned for braking a loaded vehicle.

As shown in Fig. 1 of the drawings, the variable load brake apparatus or riggng is applied to a railway vehicle truck which may be of the usual well known construction having a truck bolster 1, laterally spaced side frames (not shown) which are rigidly carried in the usual manner by the wheel and axle assemblages (not shown). The truck may also comprise a spring plank 2 which is carried by the truck frames and upon which the usual truck bolster supporting springs 3 seat. The variable load brake apparatus may comprise a brake cylinder device 4 having a cylinder which is rigidly secured to truck bolster 1 and which contains the usual piston 37 having a hollow piston rod 5 which projects beyond one end of the cylinder and in which is rockably mounted the usual push rod 6. The outer end of the push rod 6 is operatively connected by means of a pin 7 to the upper end of a vertically disposed composite lever 8 which constitutes a brake cylinder lever. The lower end of this lever 8 is operatively connected by means of a pin 9 to one end of an ordinary longitudinally extending pull rod 10 leading to other brake rigging elements (not shown) which actuate the usual friction brake element into and out of braking engagement with a wheel of a wheel and axle assemblage of a vehicle truck.

Rigidly attached to the bolster 1 and extending laterally therefrom is a bifurcated bracket 11 which is provided at the top with two horizontally aligned arcuate slots 12 through which the pin 7 is arranged to extend and thereby support the brake cylinder lever 8 and to guide the same during the operation of the brake cylinder 4 to apply the brakes. In a downwardly depending portion of the bracket 11 there are formed two horizontally aligned arcuate slots 13 which, as will appear more fully later, serve to prevent horizontal movement of a movable fulcrum member 14 when the brakes are being applied.

The brake cylinder lever 8 comprises a lever 15 which, at its upper end, is pivotally connected to the brake cylinder push rod 6 and, by means of a pin 16 located at a point intermediate the ends of lever 15, the lever is pivotally connected with the upper end of levers 17 and 18 disposed at the left-hand and right-hand sides, respectively, of the lever 15 as viewed in Fig. 2. The lower ends of the levers 17 and 18 are pivotally connected by means of the pin 9 with the pull rod 10. As best shown in Fig. 3 the levers 15, 17 and 18 are provided with matching longitudinal arcuate slots 19, 20 and 21, respectively, which slots are arranged to register with the slot 13 in the bracket 11 when the brake cylinder 4 is in release position as shown in Fig. 1. As shown in Fig. 5 a recess 22 is defined by the lower ends of levers 17 and 18 and contains a spring 23 which operatively engages one end of the recess and a lug 24 of the lever 15 so as to tend to maintain levers 15, 17 and 18 and slots 19, 20 and 21 in matching alignment to permit the vertical movement of the fulcrum member 14 and a change thereby in the brake leverage as will hereinafter more fully appear.

Rigidly attached to the bolster 1 and extending downwardly from the under side thereof is a bifurcated bracket 25 which journals a pin 26 upon which are rockably mounted in spaced relation to each other a pair of levers 27 which extend transversely of the bolster. At one side of the pin 26 the levers 27 comprise arms 28 which project beyond one side of the truck bolster, and at the other side of the pin the levers comprise arms 29, the arms 28 being of greater length than the arms 29. The outer ends of the arms 28 carry the ends of the fulcrum member 14, which member is guided through the medium of rollers 30 in the slots 13 in the bracket 11. The fulcrum member 14 passes through the slots 19, 20 and 21 of the levers 15, 17 and 18, respectively, which levers as hereinbefore mentioned constitute the brake cylinder lever 8.

The outer end of the arm 29 is connected to the upper end of a loop spring 31 by means of a pin 32. The lower end of the spring 31 is connected to the spring plank 2 through the medium of an anchor member 33 which is rigidly attached to the spring plank by adjustable screw-threaded means 34. It should be understood that the spring 31 as shown in Fig. 1 is in its normal free position and when deflected by vertical movement of the bolster 1 relative to the spring plank 2 will tend to return to its normal free position by rocking the levers 27 about the pin 26. Also, although this spring 31 is rigid enough to actuate the levers 27 when the brakes are released, it will still be resilient enough to absorb vibrations resulting from oscillatory activity between the bolster 1 and spring plank 2 when the brakes are applied.

In connection with the above it will be understood that as the load carried by the truck bolster increases, the usual truck bolster supporting springs 3 will be compressed so that the truck bolster 1 will move downwardly relative to the spring plank 2 and that this movement will always be proportional to the degree of the load, starting from empty and progressing to a maximum point at full load. If the brakes are released as this movement is occurring, the levers 27 will be caused through the medium of the spring 31 to rock in a counter-clockwise direction about the pin 26, as viewed in Fig. 1. Rocking movement of the levers 27 in a counter-clockwise direction causes the fulcrum member 14 to move downwardly relative to the brake cylinder lever 8 within the slots 19, 20 and 21. It will be obvious that any change in the position of the fulcrum member 14 with relation to the brake cylinder lever 8 in this direction will result in an increase in the leverage of the apparatus and thereby an increase in the braking power of the braking rigging when the rigging is actuated to apply the brakes.

If the load on the truck bolster is decreased when the fulcrum member 14 is free to move, the springs 3 will act to move the truck bolster 1 upwardly which movement causes the levers 27 to rock in a clockwise direction about the pin 26, the spring 31 being strong enough to resist deflection in either direction. Rocking of the levers 27 in a clockwise direction causes the fulcrum member 14 to move upwardly relative to the lever 8 within the slotted openings. Any change of the position of the fulcrum member in this direction will result in a decrease in the leverage of the brake apparatus and thereby a decrease in the braking power of the rigging when the rigging is actuated to apply the brakes.

It is preferred that both trucks of the vehicle be provided with the hereinbefore described variable load brake apparatus so that the braking effect on each truck will be in accordance with the weight of the load carried by that truck, and if there is a heavier load carried by one truck than by the other, the more heavily loaded truck will be braked heavier than the lighter loaded truck.

*Operation of the apparatus shown in Fig. 1*

When it is desired to effect an application of the brakes, fluid under pressure may be supplied to pipe 35 in the usual manner as for instance by a brake controlling valve device which may be of the well known K or AB type. Fluid under pressure supplied to the pipe 35 flows therefrom to the brake cylinder device 4 causing the brake cylinder piston 37, hollow piston rod 5 and push rod 6 to move in a direction toward the left hand as viewed in Fig. 1 against the opposing pressure of the usual release spring 36. As the push rod 6 moves in a direction toward the left hand, it first causes the lever 15 to rock about the pin 16 against the pressure of spring 23, and thereby to engage with a squared portion of the fulcrum member 14 and to then press it against the right-hand walls of the slots 20 and 21 of the levers 17 and 18, respectively. With the member 14 thus tightly clamped by the tongs-like or shear action between the lever 15 at the left-hand side and the levers 17 and 18 at the right-hand side, and thereby prevented from moving longitudinally of the lever 8, lever 8 will act as a simple brake cylinder lever rocking about the member 14. Horizontal movement of the member 14 will be prevented by the bracket 11 in which the slots 13 serve as a guide for the member. Movement of the push rod 6 in the left-hand direction will therefore actuate the lever 8 in a counter-clockwise direction to move the pull rod 10 so as to cause the brake shoes (not shown) to frictionally engage the tread of the truck wheels.

Now when the brake controlling valve device (not shown) is operated to release position, the pipe 35 will be connected to the atmosphere in the usual manner thereby venting fluid under pressure from the brake cylinder 4. When this occurs the release spring 36 in the brake cylinder device 4 will cause the brake cylinder piston and the tubular piston rod 5 to move to release position as shown in Fig. 1, thereby permitting push rod 6 and the brake cylinder lever 8 to move to release position. Upon this movement to release position, spring 23 of composite lever 8 will act through the medium of lug 24 to rock the lever 15 in a clockwise direction about the pin 16 until stopped by the lug 24 engaging the left-hand end of the recess 22 as shown in Fig. 5. Thus the spring 23 acts to move the lever 15 so that the slots 19, 20 and 21 are in matching alignment with each other while the release spring 36 acts to move said slots into parallel alignment with slots 13 in the bracket 11 as shown in Fig. 1, thus freeing the fulcrum member 14 for adjustment by vertical movement of the bolster 1.

Now if the load on the vehicle has been varied during the interval of time that the brakes on the vehicle were applied, the resulting vertical relative movement between the bolster 1 and the spring plank 2 will cause the spring 31 to be deflected out of its normal free position. When the fulcrum member 14 is unlocked by the release of the brakes, the spring 31 will return to its normal position thereby causing the levers 27 to rock about the pin 26 and thereby adjust the fulcrum member 14 in accordance with the weight of the load now on the vehicle.

It will be understood that, upon applying the brakes when conditioned for braking an empty vehicle as shown in Figure 1, the pin 7 will be propelled by the brake cylinder piston rod 5 until the friction braking element actuated thereby engages the wheel associated therewith, at which time the pin will come to rest at a point intermediate the ends of the slots 12, and that, as the load and consequently the brake leverage ratio is increased, the travel of the pin 7 to brake applied position will increase until upon applying the brakes when conditioned for braking a fully loaded vehicle, the pin 7 will come to rest close to the extreme left-hand end of slots 12 and the piston rod 5 will execute a full stroke.

*Description of the embodiment shown in Figure 6*

It is highly desirable in the fluid pressure brake art to have a substantially constant brake cylinder piston travel so that the volume of the brake cylinder in brake applied position may be a predetermined quantity and therefore the degree of fluid pressure obtained therein for a given operation of the associated brake controlling valve device may be anticipated with a substantial degree of certainty. For this reason, an additional means is provided in the second embodiment of the invention as shown in Figure 6, which means is adjustable according to the weight of the load on the vehicle to assure a full stroke of the brake cylinder piston for each application of the brakes, regardless of the load carried by the vehicle or the brake leverage determined thereby.

For the sake of clarity the parts shown in Figure 6 which are the same as those shown in Figure 1 and described in connection therewith are identified by the same reference numerals and a detailed description of the same at this point is not deemed necessary for a clear understanding of the invention.

As shown in Figure 6 this variable load brake apparatus is applied to a railway vehicle truck of the same type as described in connection with Figure 1 and may comprise the same brake cylinder device 4 and substantially the same mechanism for shifting the fulcrum member 14 according to the deflection of the truck springs 3.

Rigidly attached to the bolster 1 and extending from the side thereof is a bifurcated bracket 41 which is provided at the top with two horizontally aligned arcuate slots 42 for supporting and guiding through the medium of the pin 7 the upper end of a composite brake cylinder lever 43, the lower end of which is operatively connected by means of the pin 9 to one end of the longitudinally extending pull rod 10 leading to the other brake rigging elements which actuate a friction brake shoe 62 shown in Fig. 12 into and out of braking engagement with a wheel 63 of a wheel and axle assemblage of a truck. Rockably mounted within the lower portion of the bracket 41 by means of a pair of pins 44 so as to straddle the brake cylinder lever 43 is a yoke 45 which, as will appear more fully later, serves to change the position of the brake cylinder lever 43 relative to the brake cylinder device 4 and the brake rigging as the weight upon the bolster 1 is changed. As shown in Figure 7 there are formed in the inner lateral surfaces of the yoke 45 a pair of matching grooves 46 arranged in facing relationship to each other so as to receive the rollers 30 and be traversed thereby for guiding the fulcrum member 14 as it is actuated along the slotted openings in the lever 43.

The brake cylinder lever 43 differs in shape only from the brake cylinder lever 8 of the first embodiment hereinbefore described and therefore the corresponding members are designated by the same reference numerals without further description.

Rigidly attached to the bolster 1 and extending downwardly from the underside thereof are three spaced lugs 47 in which is journaled a pin 48 for pivotally supporting the levers 27 at either side of the central lug 49 of the bracket. As shown in Fig. 8, the levers 27 extend transversely of the bolster 1 in the same manner as shown in Fig. 1. The outer end of the arm 28 carries the fulcrum member 14 which extends through the slotted openings in brake cylinder lever 43 and is arranged to be guided by yoke 45 as previously related. The outer end of the arm 29 is connected to the upper end of the loop spring 31 by means of the pin 32, which spring has its lower end connected by means of a pin 52 to a stanchion 53, which is rigidly attached to the spring plank 2 by the adjustable screw thread means 34.

As shown in Fig. 9, axially and laterally outward of the levers 27 there is rockably mounted on the pin 48 a pair of levers 54 which constitute a bell crank having an arm 55 of which the outer end is pivotally connected by means of pins 56 to the upper end of a pair of strut members 57 which are fastened at their lower ends to the stanchion 53 by means of the pin 52 shown in Fig. 10, which pin, as previously stated, also carries the lower end of the loop spring 31. The outer end of another arm 58 of the bell crank makes a jointed connection by means of a pair of pins 59 and links 60 shown in Fig. 9 to each side of the yoke 45 for actuating the same according to the deflection of the truck springs in a manner now to be described.

As previously explained, the springs 3 will be compressed as the load carried by the truck bolster increases so that the truck bolster 1 will move downwardly relative to the spring plank 2 and in proportion to the degree of load, starting from empty and progressing to a maximum point at full load. As this movement is occurring a force is directed through the medium of the spring 31 against the arm 29 so as to tend to cause the levers 27 to rock in a counter-clockwise direction about the pin 48. If the brakes are applied at the time the load on the truck bolster is increased, the pressure exerted on the arm 29 will be absorbed by the flexure of the spring 31 and reserved thereby until such time as the brakes are released. When the fulcrum member 14 at the outer end of the arm 28 is freed by reason of the brakes being released, the spring 31 acting through the medium of the pin 56 on the arm 29 will effect the counterclockwise rotation of the levers 27, causing the fulcrum member 14 to move downwardly relative to the brake cylinder lever 43 within the slots 19, 20 and 21. As previously noted, downward movement of the fulcrum member 14 in relation to the brake cylinder lever 43 will result in an increase in the leverage of the apparatus and a proportionate increase in the travel of the push rod 6 to obtain the same degree of movement of the pull rod 10 to actuate the braking element 62 into braking engagement within the wheel 63. Means are provided in this embodiment of the invention to compensate for this change in leverage.

Since the levers 54 are carried by the bolster 1 and are connected at the outer end of arm 55 to the spring plank 2 by means of the pins 56 and strut members 57, which members are rigid, downward movement of the bolster 1 relative to the spring plank 2 will also cause the levers 54 to rock about the pin 48 in a counter-clockwise direction. Rocking in this direction, the levers 54 will act through the medium of pins 59, links 60 and pins 61 to rock the yoke 45 in the same direction about the pins 44 mounted in the bracket 41. The yoke 45 being in engagement with the bosses 70 and 71 which are provided on the levers 17 and 18, respectively, and the left-hand end of recess 22 of said levers being in engagement with the lug 24 of lever 15, counter-clockwise rocking of the yoke 45 about the pins 44 will cause the composite brake cylinder lever 43 to rock about the pin 7 in the push rod toward the fully loaded and brakes released position in which it is shown in Figure 12. If the push rod 6 is in its release position, the fulcrum member 14 will move downwardly toward its fully loaded position in which it is shown in Figure 12.

By reason of the lower end of the brake cylinder lever 43 being connected to the brake shoe 62 by means of pull rod 10, a rod 65, a brake lever 66, and other brake rigging not shown, the counter-clockwise rocking of the lever will cause the brake shoe 62 to move from the position indicated by dotted lines in Fig. 12 toward the position in which it is shown in solid lines, the latter position being that assumed when the apparatus is conditioned for braking a fully loaded vehicle.

It will thus be seen that because the brake shoe 62 is closer to the tread of the wheel 63, the brake cylinder piston rod 6 will operate through a shorter distance to bring the shoe into frictional engagement with the tread of the wheel for braking. According to the invention the decrease in the distance a brake shoe will have to travel to engage a vehicle truck wheel diminishes the travel of the brake cylinder piston rod an amount sufficient to compensate for the increase in piston travel due to the increase in the brake rigging leverage ratio. Thus, regardless of the brake rigging leverage ratio as determined by the load, the brake cylinder piston will execute a full stroke in applying the brakes.

It should here be pointed out that the rate at which the slack in the brake rigging is taken up as the apparatus is conditioned through the range from an empty to a fully loaded vehicle has an unlimited number of variations which may be obtained by varying the shape of the slotted openings in the brake cylinder lever and the grooves 46 in the yoke 45. For example, by providing a shape such as that indicated in dot-and-dash lines in Fig. 11, the slack in the brake rigging may be taken up at a constant rate over the full range from empty to fully loaded position. It will of course be necessary to elongate the opening in the lever 27 in which the fulcrum member 14 is carried to provide for relative horizontal movement between the fulcrum member and the lever as the lever is operated from empty to fully loaded position.

*Operation of the embodiment shown in Figure 6*

The variable load brake as shown in Figure 6 is in release position and conditioned for the braking of an empty vehicle, the fulcrum member 14 being held in approximately the same position relative to the brake cylinder device 4 as fulcrum member 14 in the embodiment shown in Figure 1. That is to say, the fulcrum member is located at the upper end of the slots 19, 20 and 21 of the levers 15, 17 and 18, respectively, and in this embodiment at the upper side of the grooves 46 and the yoke 45, the vertical movement of the fulcrum member relative to the brake cylinder lever 43 being regulated by the levers 27 and spring 31 as previously described in connection with Fig. 1, while the movement of the brake cylinder lever in a horizontal direction is regulated by the bell crank levers 54 through the medium of the links 60 and the yoke member 45.

To effect an application of the brakes, fluid under pressure is supplied to pipe 35 in the usual manner whence it flows to the brake cylinder device 4 causing the brake cylinder piston 37, hollow piston rod 5, the push rod 6 to move outwardly against the opposing pressure of the usual release spring 36. As in the first embodiment, the resultant initial outwardly movement of the push rod 6 causes the lever 15 to rock about the pin 16 against the pressure of the spring 23 and to engage the squared portion of the fulcrum member 14 and press it against the right hand faces of slots 20 and 21 of the levers 17 and 18, respectively, as viewed in Figure 6. With the member 14 thus tightly clamped against longitudinal movement relative to the lever 43 by the tongs-like action between the lever 15 at the left-hand side and the levers 17 and 18 at the right-hand side, lever 43 will act as a simple brake cylinder lever rocking about the member 14 being retained against horizontal movement in the grooves 46 of the yoke 45. Movement of the push rod 6 in the left-hand direction will therefore actuate the lever 43 to move the pull rod 10 to cause the brake shoes 62 to frictionally engage the tread of the truck wheel 63. It will be understood however that the brake shoes will be spaced away from the wheel treads a sufficient distance to permit the hollow piston rod 5 to execute substantially a full stroke, differing in this respect from the first embodiment shown in Fig. 1.

Now when the brake controlling valve device is operated to release position, the pipe 35 will be connected to the atmosphere in the usual manner thereby venting fluid under pressure from the brake cylinder device 4. When this occurs the release spring 36 in the brake cylinder device 4 will cause the brake cylinder piston and the tubular piston rod 5 to move to release position in which position it is shown in Figure 6, thereby permitting push rod 6 and the cylinder lever 43 to move to release position. Upon this movement to release position spring 23 of composite lever 43 will act through the medium of lug 24 to rock the lever 15 in a clockwise direction about the pin 16 until stopped by the lug 24 engaging the left hand end of the recess 22 as viewed in Figure 11. The spring 23 will act to move the slots 19, 20 and 21 into matching alignment with each other while the release spring 36 will act to move said slots into parallel alignment with grooves 46 in the yoke 45 as shown in Figure 6, thus freeing the fulcrum member 14 for adjustment by vertical movement.

Now if the load on the vehicle has been increased during the interval of time that the brakes on the vehicle were applied, the resulting vertical relative movement between the bolster 1 and spring plank 2 will have caused the spring 31 to be deflected out of its normal free position. When the fulcrum member is unlocked by the release of the brakes, the spring 31 will return to its normal position thereby causing the levers 27 to rock in a counterclockwise direction about the pin 48 and thereby adjust the fulcrum member 14 in accordance with the load now on the vehicle.

Having now described my invention, what I claim as new and desire to secure by Letters Patent, is:

1. In a variable power mechanism, in combination, a lever for transmitting power comprising two parts capable of pivotal movement relative to each other when power is applied to the lever, a fulcrum for said lever shiftable longitudinally of said parts to different positions to vary the power ratio of the lever, means operative to apply power to said lever, the parts of said lever responding to the power applied to said lever as an incident to the operation of said means to engage and hold said fulcrum in any position to which it has been shifted, said fulcrum when engaged by said parts rigidly connecting the parts together.

2. In a variable power mechanism, in combination, a lever for transmitting power comprising two pivotally connected overlapping parts capable of pivotal movement relative to each other when power is applied to the lever, said parts having formed therein slotted openings in substantial registration with each other, a fulcrum for said lever passing through said openings and being shiftable to different positions in said openings to vary the power ratio of the lever, and means operative for applying power to said lever, the parts of said lever responding to the power transmitted to said lever as an incident to the operation of said means to engage and hold said fulcrum in any position to which it has been shifted, said fulcrum when engaged by said part serving to rigidly connect the parts together.

3. In a variable load brake apparatus for a vehicle having a sprung member and an unsprung member, a brake lever operative for effecting an application of the vehicle brakes and comprising two pivotally connected overlapping parts capable of pivotal movement relative to each other, said parts having formed therein slotted openings in substantial registration with each other, a fulcrum for said lever passing through said openings and being shiftable to different positions along said openings to vary the brake leverage ratio, fulcrum shifting means movable according to movement between the sprung part and unsprung part of the vehicle for positioning said fulcrum in said openings, and a brake cylinder for operating said lever, the parts of said lever being operative as an incident to the operation of said brake cylinder to engage and hold said fulcrum in any position to which it has been shifted, and said parts being prevented by said fulcrum from further pivotal movement relative to each other.

4. In a variable load brake apparatus for a vehicle, a brake lever operable for effecting an application of the brakes and comprising two parts hinged together between the ends thereof so that one end of one part overlaps one end of the other part, said parts having formed therein slotted openings in substantial registration with each other when the brakes are released, a fulcrum for said lever having a position in said openings for providing empty vehicle braking and being shiftable therefrom to various other positions for providing various degrees of loaded vehicle braking, means operative to shift said fulcrum and thereby vary the brake lever ratio according to the weight of the load on the vehicle, a brake cylinder for operating said lever, the parts of said lever acting in response to the operation of the lever by the cylinder to engage and hold said fulcrum in any position to which it has been shifted and the fulcrum preventing further pivotal movement of the parts relative to each other.

5. In a variable load brake apparatus, a brake lever for operating a braking element to apply the brakes comprising two articulated parts partially overlapping each other and capable of pivotal movement relative to each other, each of said parts having formed therein a slotted opening for substantial registration with the other, a fulcrum for said lever passing through said openings and being shiftable along said openings for varying the power ratio of said lever, means for shifting said fulcrum along said openings so as to vary the braking power according to the weight of the load on the vehicle, and a brake cylinder for operating said lever to effect an application of the brakes, the parts of said lever acting in response to the operation of the brake cylinder to lock said fulcrum against further shifting and the fulcrum limiting the movement of said parts relative to each other in response to the operation of the brake cylinder.

6. In a variable load brake apparatus, a brake lever for operating a braking element to apply the brakes comprising two articulated parts partially overlapping each other and capable of pivotal movement relative to each other, each of said parts having formed therein a slotted opening for substantial registration with the other, a fulcrum for said lever passing through said openings and being shiftable along said openings for varying the power ratio of said lever, means for shifting said fulcrum along said openings so as to vary the braking power according to the weight of the load on the vehicle, a brake cylinder for operating said lever to effect an application of the brakes, the parts of said lever acting in response to the operation of the brake cylinder to lock said fulcrum against further shifting and the fulcrum limiting the movement of said parts relative to each other in response to the operation of the brake cylinder, and means for retaining said parts in position for the openings to register at all other times.

7. A variable load vehicle brake apparatus of the type having a movable fulcrum for varying the brake leverage ratio according to the load carried by the vehicle, in combination, one lever operatively connected at one end to a member to be operated, another lever for operating said one lever and being pivotally connected intermediate its ends to and having one end overlapping the other end of said one lever, the overlapping portions of each of said levers being provided with a matching longitudinal slot, a movable fulcrum disposed in the slots, means for actuating said movable fulcrum, and a brake cylinder operatively connected to the other end of said other lever for first actuating said other lever about said other end of said one lever until said fulcrum is locked between said levers against movement longitudinally of said levers and then to actuate both levers about said fulcrum to apply the brake.

8. In a variable load brake apparatus, a brake lever for operating a braking element to apply the brakes comprising two articulated parts partially overlapping each other and capable of pivotal movement relative to each other, each of said parts having formed therein a slotted opening in substantial registration with the other, a fulcrum passing through the openings and being shiftable along said openings to vary the power ratio of said lever, means for shifting said fulcrum along said openings according to the weight of the load on the vehicle, a brake cylinder for operating said lever to effect an application of the brakes, and means responsive to the weight of the load on the vehicle for bringing the braking element closer to its braking position as the weight of the load increases.

9. In a variable load brake apparatus for a vehicle having a stationary member and a member movable vertically relative thereto in response to the weight of the load on the vehicle, a brake lever for operating a braking element to apply the brakes having a longitudinal slot formed therein, a fulcrum passing through said slot and being shiftable along said slot for varying the power ratio of said lever, means for shifting said fulcrum along said slot according to the weight of the load on the vehicle, a brake cylinder for operating said lever to effect an application of the brakes, and means operatively connected between said stationary member and said movable member for taking up slack between the brake cylinder and the braking element according to the weight of the load on the vehicle.

10. In a variable load brake apparatus for a vehicle having a stationary member and a member movable vertically relative thereto in response to the weight of the load on the vehicle, a brake lever for operating a braking element to apply the brakes having a longitudinal slot formed therein, a fulcrum passing through said slot and being shiftable along said slot for varying the power ratio of said lever, means for shifting said fulcrum along said slot according to the weight of the load on the vehicle, a brake cylinder for operating said lever to effect an application of the brakes, and linkage mounted on said movable member and coupled between said stationary member and said lever to actuate said lever toward its brake application position an amount corresponding to the amount of vertical movement of the movable member relative to the stationary member.

EMIL G. MUELLER.